United States Patent
Kim

(10) Patent No.: US 8,575,892 B2
(45) Date of Patent: Nov. 5, 2013

(54) CHARGING APPARATUS FOR MOVING ROBOT AND METHOD THEREOF

(75) Inventor: Young Gie Kim, Seoul (KR)

(73) Assignee: LG Electronics Inc., Seoul (KR)

(*) Notice: Subject to any disclaimer, the term of this patent is extended or adjusted under 35 U.S.C. 154(b) by 535 days.

(21) Appl. No.: 12/447,148

(22) PCT Filed: Oct. 25, 2007

(86) PCT No.: PCT/KR2007/005271
§ 371 (c)(1),
(2), (4) Date: Jul. 1, 2009

(87) PCT Pub. No.: WO2008/051027
PCT Pub. Date: May 2, 2008

(65) Prior Publication Data
US 2010/0026247 A1  Feb. 4, 2010

(30) Foreign Application Priority Data

Oct. 25, 2006 (KR) .................. 10-2006-0104007

(51) Int. Cl.
*H02J 7/00* (2006.01)
*B25J 5/00* (2006.01)

(52) U.S. Cl.
USPC .......... 320/109; 320/152; 320/157; 320/162; 901/33; 901/35; 901/40; 901/41; 318/568.12; 318/568.2

(58) Field of Classification Search
USPC .................................. 320/162, 109
See application file for complete search history.

(56) References Cited

U.S. PATENT DOCUMENTS

| | | | |
|---|---|---|---|
| 7,834,584 B2* | 11/2010 | Koyanagi et al. | 320/107 |
| 2004/0088081 A1* | 5/2004 | Song et al. | 700/259 |
| 2005/0083011 A1* | 4/2005 | Yang et al. | 320/107 |
| 2005/0150074 A1* | 7/2005 | Diehl et al. | 15/327.5 |
| 2005/0156562 A1* | 7/2005 | Cohen et al. | 320/107 |
| 2005/0231156 A1* | 10/2005 | Yan | 320/107 |
| 2006/0043929 A1 | 3/2006 | Koyanagi et al. | |
| 2007/0229031 A1* | 10/2007 | Song et al. | 320/128 |
| 2009/0228165 A1* | 9/2009 | Ozick et al. | 701/23 |

FOREIGN PATENT DOCUMENTS

| | | |
|---|---|---|
| JP | 2006-68845 A | 3/2006 |
| KR | 10-2004-0041277 A | 5/2004 |
| KR | 10-2004-0095442 A | 11/2004 |

OTHER PUBLICATIONS

PCT Written Opinion for PCT/KR2007/005271 mailed on Feb. 24, 2008.*

* cited by examiner

*Primary Examiner* — Drew A Dunn
*Assistant Examiner* — Nathaniel Pelton
(74) *Attorney, Agent, or Firm* — Birch, Stewart, Kolasch & Birch, LLP

(57) ABSTRACT

Provided is a charging apparatus for a moving robot including a charging terminal that is connected to a terminal for charging a battery of the moving robot; a power supply unit that supplies a charging voltage for charging the battery of the moving robot; a power switching unit that outputs a detection signal, depending on whether a voltage is applied from the charging terminal or not, and switches a current flow between the power supply unit and the charging terminal in accordance with an input control signal; and a control unit that responds to the detection signal so as to output the control signal.

4 Claims, 4 Drawing Sheets

# CHARGING APPARATUS FOR MOVING ROBOT AND METHOD THEREOF

TECHNICAL FIELD

The present invention relates to a charging apparatus for a moving robot and a method thereof, and more specifically, to a charging apparatus for a moving robot and a method thereof, which supplies a charging voltage only when the moving robot comes in contact with the charging apparatus so as to be charged.

BACKGROUND ART

The development of scientific technology, which has been concentrated on expansion in terms of quantity, is gradually focused on the enhancement of life quality. Simultaneously, attempts to construct a more convenient and intelligent living environment by granting various recognition functions of human beings to creatures developed by human beings are being continued. Among such attempts, a robot engineering field is considered to be the core of high-tech application engineering. A demand for industrial and medical robots is being rapidly increasing.

Recently, domestic robots are also developed in addition to the industrial and medical robots. As for an example of the domestic robots with which people can easily come in contact, a robot cleaner is provided. The robot cleaner, which is one of moving robots, generally has flat and circular disk-shaped wheels and serves to suck foreign matters and dust while traveling around all the corners of a house.

Such a moving robot monitors a charging state of an internal battery for providing a supply voltage. When the charging of the battery is necessary, the moving robot moves to a charging apparatus for the moving robot such that the battery of the moving robot is charged by the charging apparatus. Then, the moving robot resumes the operation.

When the moving robot is charged, a high voltage of 25 to 40V is used. Therefore, when the moving robot comes in contact with a charging terminal of the charging apparatus, a high voltage may be momentarily applied so that a spark occurs. Thus, a circuit related to the battery charging may be damaged, and an electric shock may occur. To prevent such a spark from occurring, a method is usually used, in which only when the moving robot comes in contact with the charging apparatus to push the charging terminal to the inside of the charging apparatus, the charging terminal is contacted with an internal switch such that a charging voltage is supplied. That is, only when the moving robot pushes the charging terminal to the inside, the charging voltage is supplied to the charging terminal. When the moving robot does not come in contact with the charging apparatus, the charging voltage is not applied to the charging terminal. Accordingly, a safety degree increases.

In such a method, however, a person or pet as well as the moving robot happens to push the charging terminal. In this case, the charging voltage is applied to the charging terminal such that an electric shock may occur. Therefore, there are difficulties in securing stability.

DISCLOSURE

Technical Problem

The present invention provides a charging apparatus for a moving robot and a method thereof, which can stably charge the moving robot while preventing an electric shock or spark from occurring.

Technical Solution

According to an aspect of the invention, a charging apparatus for a moving robot includes a charging terminal that is connected to a terminal for charging a battery of the moving robot; a power supply unit that supplies a charging voltage for charging the battery of the moving robot; a power switching unit that outputs a detection signal, depending on whether a voltage is applied from the charging terminal or not, and switches a current flow between the power supply unit and the charging terminal in accordance with an input control signal; and a control unit that responds to the detection signal so as to output the control signal. According to another aspect of the invention, a method of charging a moving robot includes judging whether or not a voltage is applied from a charging terminal to which a terminal for charging a battery of the moving robot is connected; when the voltage is applied from the charging terminal, supplying to the charging terminal a charging voltage for charging the battery of the moving robot; and when the voltage is not applied from the charging terminal, cutting off the charging voltage supplied to the charging terminal.

DESCRIPTION OF DRAWINGS

The present invention will become more fully understood from the detailed description given herein below and the accompanying drawings, which are given by illustration only, and thus are not limitative of the present invention, and wherein.

BEST MODE

Hereinafter, the present invention will be described in detail with reference to the accompanying drawings.

Figure 1:
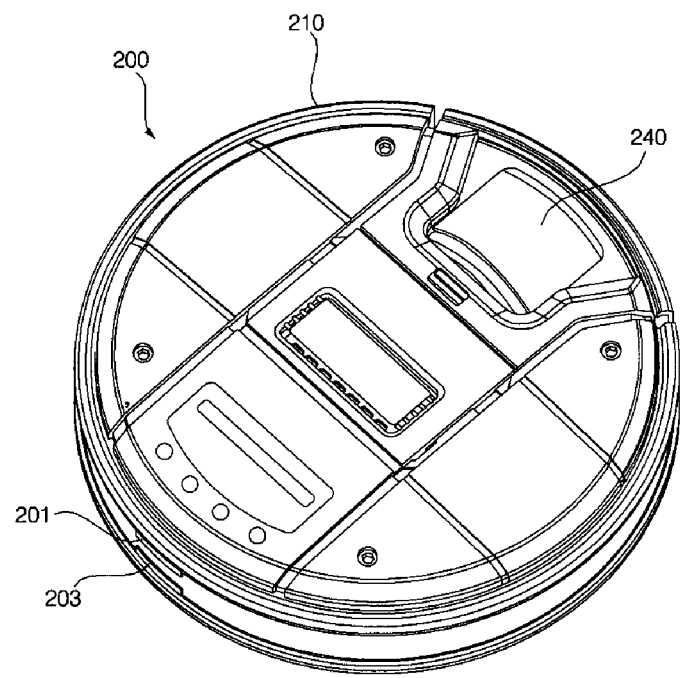
FIG. 1 is a diagram showing an example of a moving robot.

FIG. 1 is a diagram showing an example of a moving robot, or specifically, a robot cleaner. Referring to FIG. 1, the robot cleaner 200 serves to suck dust and foreign matters, while moving on a floor, and includes a case 210 formed in a disk shape with a predetermined thickness. The robot cleaner 200 has a suction nozzle unit (not shown) installed on the bottom surface of the case 210, and foreign matters sucked by the suction nozzle unit are collected into a dust collection unit 240 while being separated from the air. The robot cleaner 200 receives operation power through a battery provided therein, and the case 210 includes terminals 201 and 203 for charging the battery.

Figure 2:
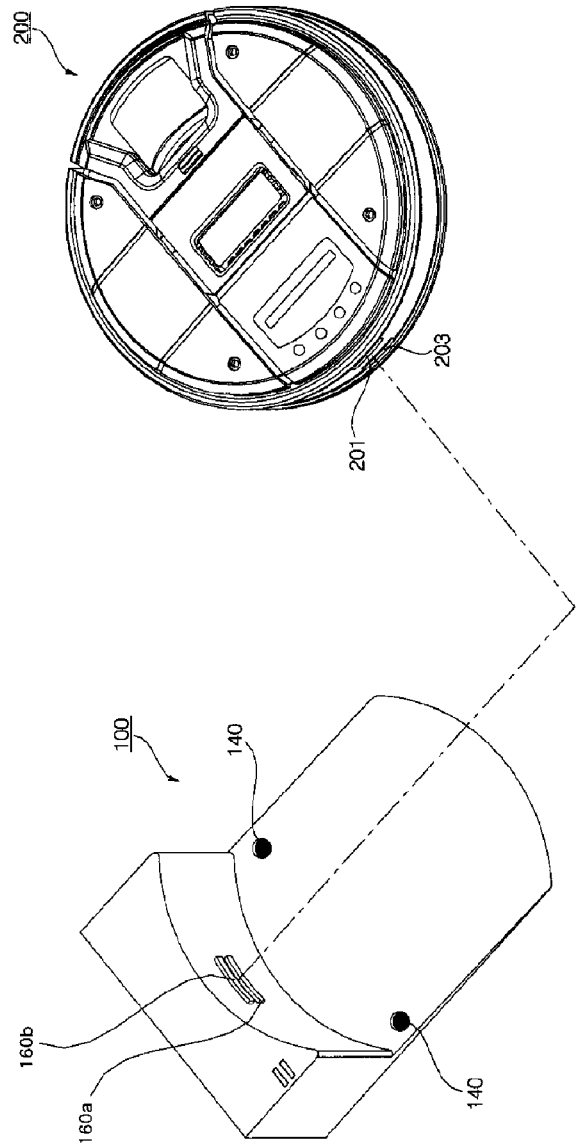
FIG. 2 is a diagram showing a charging apparatus for a moving robot according to an embodiment of the present invention.

FIG. 2 is a diagram showing a charging apparatus for a moving robot according to an embodiment of the invention. In FIG. 2, the robot cleaner shown in FIG. 1 is illustrated as an example of the moving robot. However, the charging apparatus according to the invention can be applied to all moving robots which are moved by a predetermined driving unit and return to the charging apparatus when charging is necessary, in addition to the robot cleaner.

FIG. 2 illustrates the moving robot 200 formed in a disk shape with a predetermined thickness and the charging apparatus 100 for the moving robot. The charging apparatus 100 sends a guide signal for indicating a direction and distance such that the moving robot 200 can return, and charges the battery which is provided in the moving robot 200 so as to provide operation power when the moving robot 200 is docked.

The charging apparatus 100 includes a guide signal sending unit (not shown) which sends a guide signal for guiding the return of the moving robot 200 and charging terminals 160a and 160b which are connected to the terminals 201 and 203 for charging the battery of the moving robot 200 so as to supply a charging voltage. When the moving robot 200 detects lack of battery power while traveling and operating, the moving robot 200 returns to the charging apparatus 100. At this time, in accordance with a guide signal received from the charging apparatus 100, the moving robot 200 judges a distance and direction to the charging apparatus 100 so as to set an advancing direction. Then, while correcting a current position, the moving robot 200 returns to the charging apparatus 100. The charging apparatus has a docking detection unit 140 for detecting whether the moving robot 200 is docked or not. Therefore, it is possible to detect whether the moving robot 200 is settled in a docking position or not.

Figure 3:
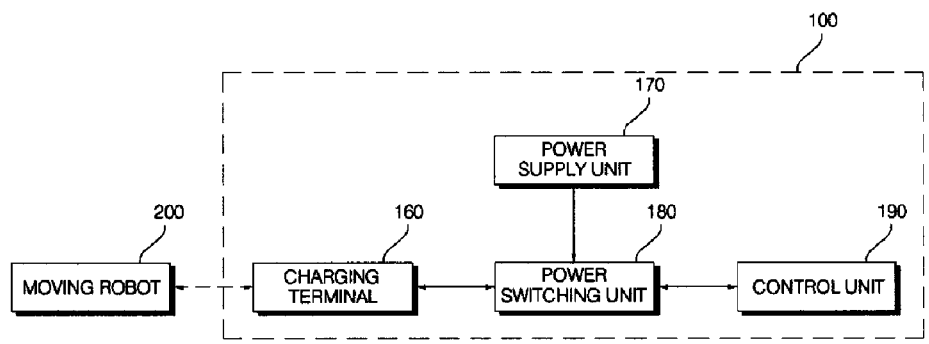
FIG. 3 is a block diagram of the charging apparatus according to an embodiment of the invention.

FIG. 3 is a block diagram of the charging apparatus according to an embodiment of the invention. Referring to FIG. 3, the charging apparatus 100 for moving robot includes a charging terminal 160, a power supply unit 170, a power switching unit 180, and a control unit 190.

The charging terminal 160 is connected to a terminal for charging the battery of the moving robot 200 and the power supply unit 170 serves to supply a charging voltage for charging the battery of the moving robot 200. The power switching unit 180 delivers first and second detection signals to the control unit 190, depending on whether or not a voltage is applied from the charging terminal 160 connected to the moving robot 100. The power switching unit 180 serves to switch a current flow between the charging terminal 160 and the power supply unit 170 in accordance with the control of the control unit 190 such that the charging voltage is supplied to the charging terminal 160 or is not supplied to the charging terminal 160.

The control unit 190 serves to output a control signal for controlling the switching of the power switching unit 180, depending on the first and second detection signals delivered from the power switching unit 180. That is, when power is applied from the charging terminal 160 such that the first detection signal is output from the power switching unit 180, the control unit 190 outputs a first control signal to the power switching unit 180 such that a current is flown between the power supply unit 170 and the charging terminal 160. Further, when power is not applied from the charging terminal 160 such that the second detection signal is output from the power switching unit 180, the control unit 190 outputs a second control signal to the power switching unit 180 such that the current flow between the power supply unit 170 and the charging terminal 160 is cut off. In addition, the control unit 190 serves to control the overall operation of the charging apparatus 100.

Figure 4:
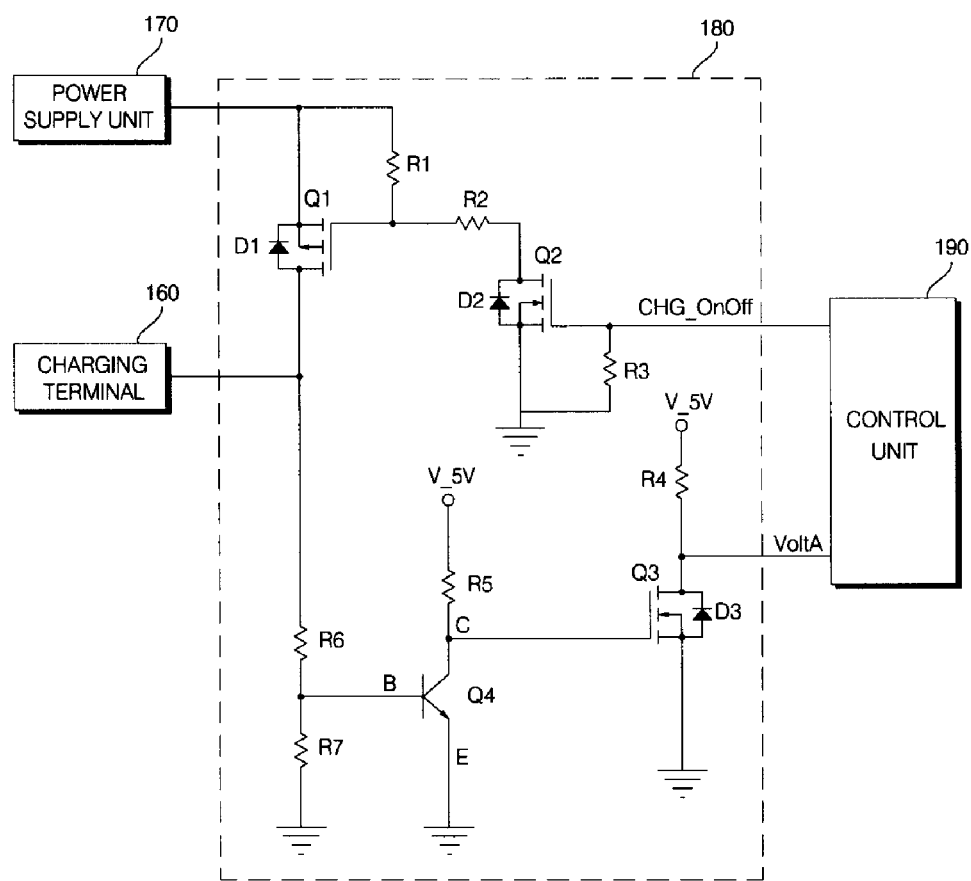
FIG. 4 is a circuit diagram of the charging apparatus according to an embodiment of the invention.

FIG. 4 is a circuit diagram of the charging apparatus for a moving robot according to an embodiment of the invention. Referring to FIG. 4, when the terminal for charging the battery of the moving robot 200 comes in contact with the charging terminal 160, a voltage is applied to the charging terminal 160 from the moving robot 200. That is, since the terminal for charging the battery of the moving robot 200 is connected to the battery provided in the moving robot 200, a voltage is applied through the terminal for charging the battery, if the battery were not completely discharged.

As the voltage is applied through the charging terminal 160, an NPN transistor Q4 is turned off. When the NPN transistor Q4 is turned off, a supply voltage V_5V is applied to the gate of an NMOS transistor Q3 such that the NMOS transistor Q3 is turned off. Accordingly, the supply voltage V_5V is applied to a terminal VoltA of the control unit 190 through a resistor R4. Therefore, the control unit 190 can grasp that the charging terminal 160 is connected to the terminal for charging the battery of the moving robot 200.

When the control unit 190 detects that the charging terminal 160 is connected to the terminal for charging the battery of the moving robot 200, the control unit 190 outputs a signal CHG_OnOFF with a high level so as to turn off an NMOS transistor Q2. Accordingly, a voltage is applied to the gate of a PMOS transistor Q1 through a resistor R1 from the power supply unit 170. Then, the PMOS transistor Q1 is turned on, and a charging voltage is supplied to the charging terminal 160 from the power supply unit 170. As a result, the battery provided in the moving robot 200 is charged.

The moving robot 200 has a charge detection unit provided therein. Therefore, when the battery is charged with more than a predetermined voltage, the moving robot 200 is separated from the charging apparatus 100. When the charging of the moving robot 200 is completed so that the moving robot 200 is separated from the charging apparatus 100, a voltage is not applied to the charging terminal 160. Therefore, the NPN transistor Q4 is turned on, and thus the NMOS transistor Q3 is also turned on.

As the NMOS transistor Q3 is turned on, a voltage corresponding to a low-level signal is applied to the terminal VoltA of the control unit 190. Therefore, the control unit 190 can grasp that the moving robot 200 was separated from the charging terminal 160.

When the control unit 190 detects that the moving robot 200 is separated from the charging terminal 160, the control unit 190 outputs a signal CHG_OnOFF with a low level so as to turn on the NMOS transistor Q2. As the NMOS transistor Q2 is turned on, the PMOS transistor Q1 is turned off, so that the charging voltage supplied to the charging terminal 160 from the power supply unit 170 is cut off. Through the above-described process, the charging voltage can be supplied to the charging terminal 160 or cut off, depending on whether a voltage is applied from the charging terminal 160 or not.

Figure 5:
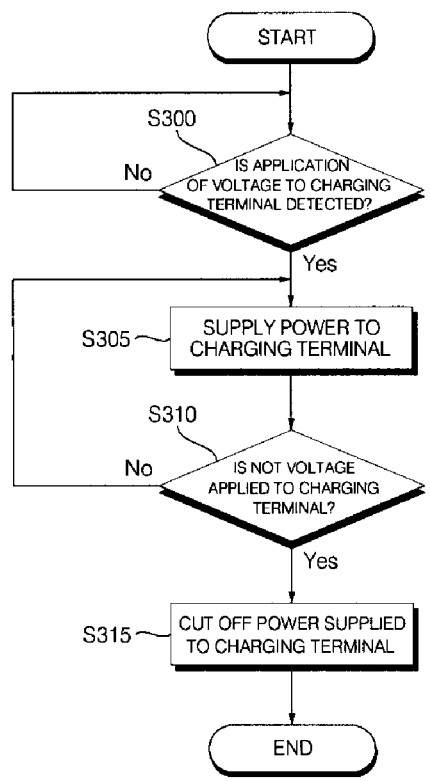
FIG. 5 is a flow chart for explaining an operation method of the charging apparatus for a moving robot according to an embodiment of the invention.

FIG. 5 is a flow chart for explaining an operation method of the charging apparatus for a moving robot according to the invention. Referring to FIG. 5, when the moving robot 200 is docked with the charging apparatus 100 in accordance with the guide signal, the battery charging terminal of the moving robot 200 is connected to the charging terminal 160. Accordingly, when the application of voltage from the charging terminal 160 is detected (step S300), the control unit 190 outputs a first control signal to the power switching unit 180 such that power is supplied to the charging terminal 160 from the power supply unit 170 (step S305). At this time, the control unit 190 can grasp, through the first detection signal output from the power switching unit 180, that the voltage has been applied from the charging terminal 160. The supplying of the power to the charging terminal 160 is continued until the charging of the moving robot 200 is completed so that the moving robot 200 is separated from the charging terminal 160 (steps S305 and S310).

When the moving robot 200 is separated from the charging terminal 160 such that a voltage is not applied from the charging terminal 160, the power switching unit 180 outputs the second detection signal. Accordingly, the control unit 190 outputs the second control signal to the power switching unit 180 such that the voltage supplied to the charging voltage 160 from the power supply unit 170 is cut off (step S315).

Through the above-described process, only when the battery charging terminal of the moving robot 200 is connected to the charging terminal 160, the charging voltage is supplied to the charging terminal 160 from the power supply unit 170, which makes it possible to stably charge the moving robot 200.

INDUSTRIAL APPLICABILITY

According to the present invention, only when the moving robot comes in contact with the charging apparatus such that a voltage is applied to the charging terminal, the charging voltage is supplied to the charging terminal. Therefore, it is possible to stably charge the moving robot while preventing an electric shock or spark from occurring.

While the present invention has been described with reference to exemplary embodiments thereof, it will be understood by those skilled in the art that various changes and modifications in form and detail may be made therein without departing from the scope of the present invention as defined by the following claims.

The invention claimed is:

1. A charging apparatus for a moving robot, comprising:
   a charging terminal connected to a terminal and configured to charge a battery of the moving robot;
   a power supply unit configured to supply a charging voltage that charges the battery of the moving robot;
   a power switching unit configured to output a detection signal depending on whether a voltage is applied from the charging terminal, and switches a current flow between the power supply unit and the charging terminal in accordance with a control signal;
   a guide signal sending unit that sends a guide signal for guiding the return of the moving robot; and
   a control unit that responds to the detection signal so as to output the control signal,
   wherein the detection signal includes a first detection signal, which is output when the voltage is applied from the charging terminal, and a second detection signal which is output when the voltage is not applied from the charging terminal,
   wherein when the first detection signal is output, the control unit outputs a first control signal such that a current flows between the power supply unit and the charging terminal,
   wherein when the second detection signal is output, the control unit outputs a second control signal such that the current flow between the power supply unit and the charging terminal is cut off, and wherein the voltage is applied to the charging terminal from the battery of the moving robot, and
   wherein the power switching unit includes a switching element which is turned on and off, depending on whether the voltage is applied to the charging terminal, and outputs a voltage corresponding to any one of the first and second detection signals.

2. The charging apparatus according to claim 1, wherein the power switching unit includes a second switching element which is turned on/off in accordance with the control unit so as to switch the current flow between the power supply unit and the charging terminal.

3. The charging apparatus according to claim 1, further comprising:
   a docking detection unit that detects whether the moving robot is docked.

4. The charging apparatus according to claim 1, wherein the moving robot is a robot cleaner.

* * * * *